2,244,327

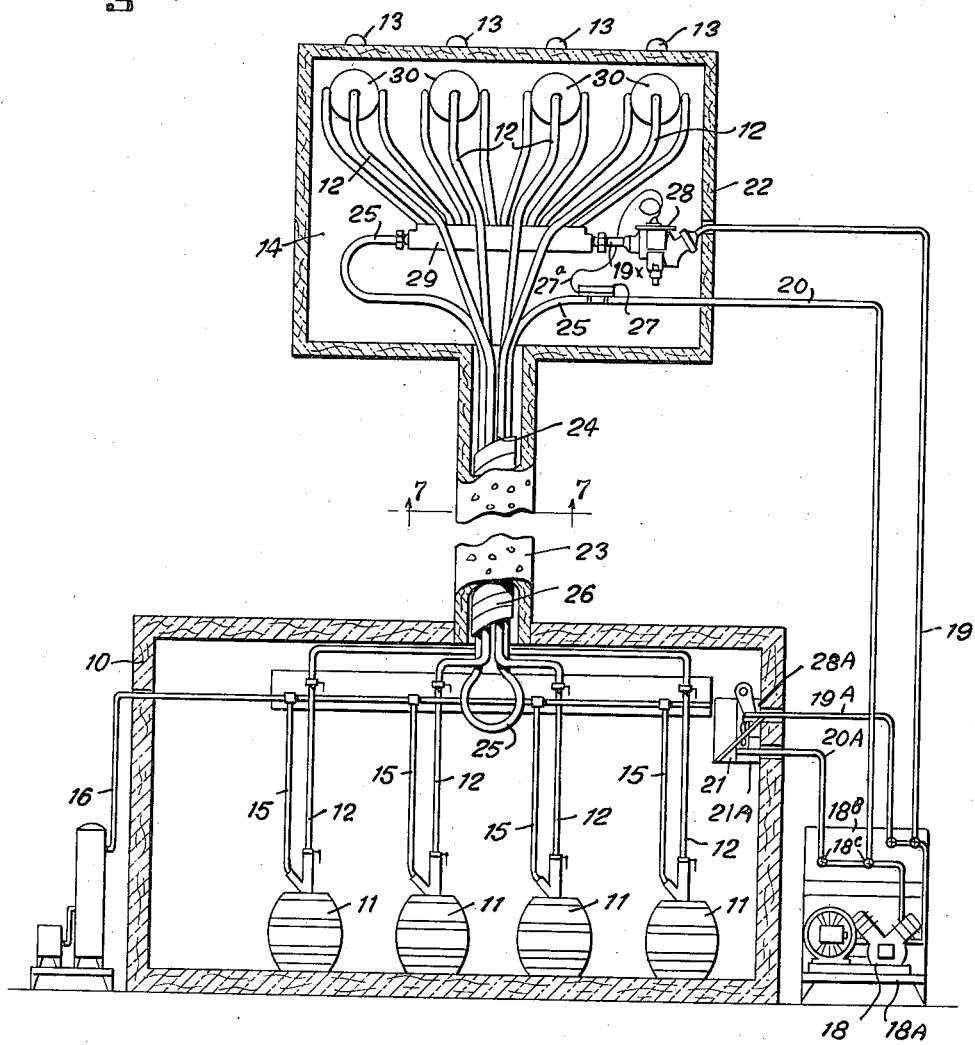
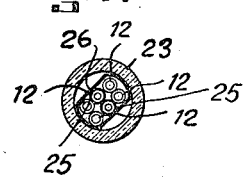

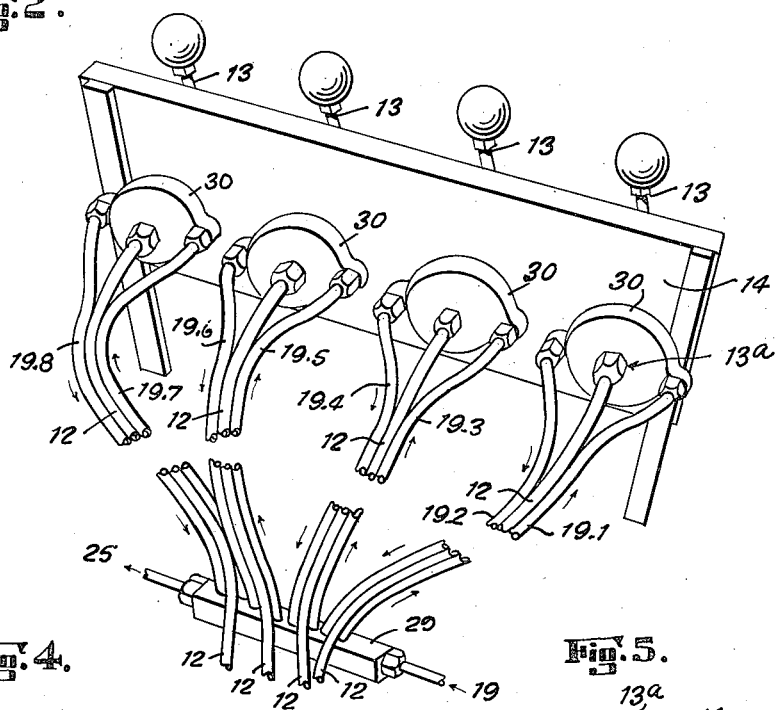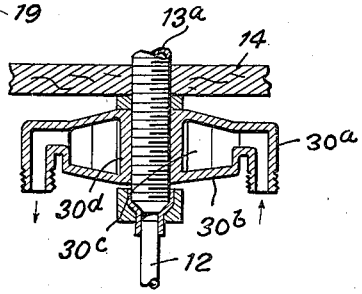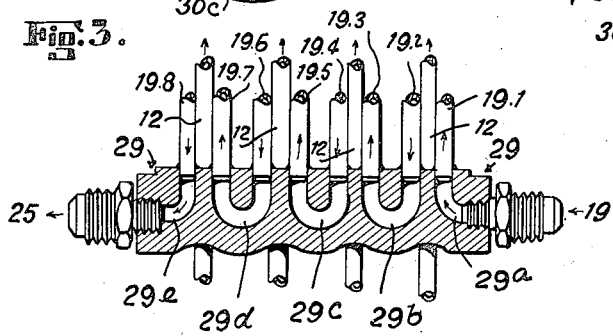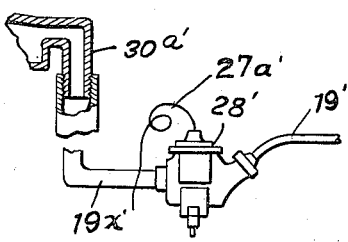
INVENTOR
Alfred H. Brundage
BY
Emery, Varney, Whittemore & Dix
ATTORNEYS Patented June 3, 1941

UNITED STATES PATENT OFFICE 2,244,327

METHOD AND APPARATUS FOR REGULATING THE TEMPERATURE OF FLUIDS

Alfred H. Brundage, Maplewood, N. J.

Application December 12, 1939, Serial No. 308,768

13 Claims. (Cl. 62—141)

This invention relates to method and apparatus, including system and details, for regulating the temperature of fluids stored in one place and transported through pipes or lines to another place, particularly including such fluids as potable beverages. The invention has found and will find employment, among other applications, in regulating the temperature of beer while the same is stored and at rest in kegs, and in conduits, and as well while the same flows in such conduits from the kegs to a distant place where dispensed, served and consumed. Such kegs may be stored in an insulated storage room, such as a so-called "walk-in" refrigerator or a so-called "beer pre-cooling room," to which may be connected the conduits leading therefrom to refrigerated outlets or faucets at or near the place where consumed. The novelty of this invention lies in the improved combination of effective means for controlling the temperature of the contents of an insulated storage room with a novel means for controlling the temperature of fluids in the conduits leading from such storage room and the liquid containers stored therein to refrigerated outlets or faucets at a distant point, so that by means of a single heat-removing apparatus, the stored fluid may be controlled at one temperature while the fluid flowing therefrom in connected conduits may be controlled at the same or at any different temperature.

Heretofore various means have been contrived whereby to accomplish the general purpose. For example, the conduits connecting the stored liquids with distant outlets have been placed within a large pipe or conduit through which artificially chilled air is caused to circulate; in some cases such chilled air is wasted at or near the end of such lines; in other cases, such air is returned to the point of beginning where it is re-cooled, and sometimes such return is effected through a so-called return line which may be in contact with the outgoing line, or such return line may in fact enclose both the outgoing air line and the line or lines containing the beverage, the temperature of which is the subject of regulation (the treated fluid). Other systems employ circulating water or brine in substantially like manner; that is, by placing the pipe or lines containing the treated fluid in contact with other pipes or lines containing the chilled or treating fluid, and this throughout the entire distance over which the treated fluid is to be conveyed; and such systems may or may not cause the treating fluid to be returned to the point of beginning, and when so returned the lines containing the treating fluid may be in or out of contact with the lines containing the treated fluid.

Practical experience has demonstrated that all of these methods will operate under conditions within their several limitations. None of them, however, will operate under all conditions commonly met in pactice, and none of them will allow of a distinctly controlled differentiation of temperatures of the stored fluid and the conducted fluid. Methods wherein the treating medium is air function imperfectly where the beverage is to be conveyed a relatively long distance and over a devious route; methods wherein the treating medium is circulating water or other liquid which is not highly volatile, do not accomplish precise temperature control at all times and over relatively long distances.

Actual experience in the field, under all manner of operating conditions has demonstrated that my invention will, under any conditions and for any distance, precisely regulate the temperature of the treated beverage.

It will be seen that the present invention provides an improved system wherein the treated fluid is separately cooled in storage and in passage; that in each case the cooling is effective and accurate; that it provides an improved means of controlling the cooling action; that it provides improved apparatus in detail which makes assembly easier and operation more efficient; and that in general it provides distinct improvements in method and apparatus in this art.

For purposes of illustration and without limitation upon the scope of the invention itself, a preferred embodiment of the invention will now be described in connection with the accompanying drawings, wherein:

Fig. 1 is an elevational view, partly in section, of a system embodying the invention;

Fig. 2 is an enlarged partial elevation, viewed somewhat from above, of the upper or dispensing portion of the system;

Fig. 3 is an enlarged sectional view of a conduit connecting member or casting;

Fig. 4 is an enlarged view of an exchange and connecting member or "doughnut" casting;

Fig. 5 is a section taken on the line 5—5 of Fig. 4;

Fig. 6 is an elevational view of a modified portion of the system; and

Fig. 7 is a cross-section taken on the line 7—7 of Fig. 1.

This invention provides a conventional refrigerator storage box or room 10, usually large enough to allow the operator to walk in, and usually not less than 6' x 6' x 6', interior dimensions (this for convenience; the box may of course be of a different size), the air in which is maintained at a desired temperature (in the case of beer between 36 degrees and 40 degrees) by means of a conventional unit 21 consisting of expansion coil and electrically operated blower fan, to which is connected a thermostatic expansion valve 28A with a temperature control bulb 21a all within such box. To such unit 21 are connected liquid or pressure line 19A and suction line 20A leading to a motor-compressor unit 18 situated outside said refrigerated box 10. The temperature within such storage box may thus be controlled in the usual manner and maintained at any predetermined degree within the range of the capacity of the motor-compressor; and all this is according to conventional standard practice for mechanically refrigerating a so-called "walk-in" type storage box by means of volatilizing liquid into gas and then compressing gas back into liquid. In addition, however, to providing refrigeration for the interior of the box, as described, my invention comprehends that by means of the same motor-compressor, the temperature of the beer (or other fluid) lying or flowing in conduits 12 leading from kegs 11 in such box may also be controlled by a separate thermostatic expansion valve 28 with temperature control bulb 27 and maintained at any predetermined degree (within the capacity range of the motor-compressor), and this regardless whether such conduits shall be in length twenty-five feet or less, or shall exceed one hundred feet; also, regardless whether intervening obstacles make it necessary that such conduits deviate from a straight line, as is often the case so that the same must be led tortuously up, down and around for one hundred feet or more, and even through cellar and boiler rooms where experience has shown the air temperature to be in fact 100 degrees to 125 degrees, Fahrenheit, at all times. By means of my invention, regardless of any of these circumstances, the treated fluid in the storage box, in the conduits between said box and the point of dispensing, and in the faucets 13 at the point of dispensing, may be kept at one and the same temperature, if that be desired, or the treated fluid in the storage box may be kept at one temperature, e. g., 36 degrees, while the treated fluid in the conduits and in the faucets may be kept at a predetermined temperature a few degrees higher, e. g., 40 degrees; and said temperatures may be regulated or varied at will between 32 degrees and natural room temperature. All this is true whether or not the treated fluid is drawn at frequent or recurrent intervals, or whether or not it is drawn at all.

This result is accomplished in the manner next described. The conventional motor-compressor is mounted outside the storage box, and as near as may be thereto, on a stout frame 18A fitted with a panel board 18B. As many pairs of liquid and suction lines are connected with the compressor as are required to accomplish the particular purpose in hand; and the function of all of such lines is the same, i. e., to convey expansible liquid, i. e., the refrigerating or treating fluid, such for example as methyl-chloride, to an expansion pipe or coil, and to return the expanded gas to the motor-compressor. In usual practice two pairs of such lines are provided; one pair 19A, 20A is to effect refrigeration of the storage box by means of the blower expansion coil 21 located therein; and the second pair of lines 19, 20 is to effect refrigeration of the conduits 12 and faucets 13 which convey the treated fluid from the storage box to the point of dispensing. Each of such pairs of lines is made to pass over and are affixed to the said panel board where manifold valves 18C are provided to shut off the flow of refrigerant liquid or gas or both, from any one of such pairs of lines and thus to start or end refrigeration in either or both of the places described. Suitable condensers, coolers and the like (not shown) appurtenant to refrigerating systems, may, of course, be used.

The method or manner of accomplishing the result of reducing, maintaining, or regulating the temperature of the fluid in the conduits between the storage box and the point of dispensing is as follows: Usually the motor-compressor is located in the basement or other convenient place near the storage box, and the point of dispensing is usually located in a public room, e. g., a bar-room, on the floor above. A liquid or pressure line 19 is led from the motor-compressor (by way of condenser, etc., if required) over the panel board to or near the point of dispensing. The purpose of this line is to convey the expansible refrigerant liquid at natural room temperature from the motor-compressor to the place where refrigeration is to begin, usually at a point within an insulated box 22 measuring approximately 12" x 24" x 36" known as a beer dispensing box. Such box is usually located at a convenient point at the bar, with the large panel 14 in a vertical plane, and usually the dispensing faucets are mounted on such large panel by inserting the rear stems 13a thereof through holes provided in such panel, as hereinafter described. The aforesaid liquid line 19 is introduced into such box through an aperture provided, and just within said box a conventional thermostatic expansion valve 28 is connected whereby to volatilize the refrigerating liquid in such liquid line, and the outlet orifice of such valve is firmly and tightly connected, by a short piece of line 19x, flared or soldered, to the near end of a conduit connecting member or casting 29, devised for the particular purpose of the invention.

Such member or casting 29 (Fig. 3) may be of any metal or plastic or other material of like characteristics, but preferably is formed or cast of a metal of good thermal conductivity, such as brass or copper; may be of any convenient size but is usually about 1½" x 1½" x 7", approximately straight in length and with either square or rounded sides, and such special casting is firmly mounted or fastened within the beer dispensing box 22. There are in such casting several round, molded channels as follows: A channel 29a beginning in the entrance end of said casting, in length about one inch, thence at approximate right angles about one inch and opening or emerging on the long side of said casting about one inch from the entrance end thereof. In addition, such casting contains three or more pairs of U-shaped channels 29b, 29c, 29d, which begin and end at spaced intervals along the length of said casting, approximately one inch apart. The first of such U-shaped channels begins about one inch from the emergent orifice of the first described channel, and leads downward into said casting approximately one inch, then turns and bends in U fashion and emerges from said casting in line with other channel openings provided along the length of said casting; the second and third and remaining such U-shaped channels are of like beginning, route and end. Each orifice of beginning and ending is spaced about one inch from the nearest other orifice, and all channel orifices in the length of said casting are in line with each other as aforesaid. The emergent end of such casting is provided with a channel 29e like that in the entrance end, that is, a channel beginning about one inch from the emergent end of the long side of such casting, and leading downward about one inch, thence at approximately right angles about one inch, and emerging through the end of such casting. None of such U-shaped channels and the two end channels are directly connected with each other. All of such channels are usually formed ⅜″ in diameter.

As stated, the liquid refrigerant line 19x is led from the thermostatic expansion valve within the beer dispensing box to the channel beginning in the entrance end of such special casting 29, and there same is firmly and tightly connected by a flare-nut or soldering or like convenient means. A continuation of such line, that is, a separate piece of refrigerant line 19.1, is next connected by the same means to the orifice of emergence of such first channel 29a. Such separate piece of refrigerant line, usually about 24″ long, is led to a point near the stem or butt end of the first dispensing faucet 13.

The dispensing faucets 13, usually four in number, may be of any standard conventional type, and are usually installed side by side on the vertical panel 14 of said beer dispensing box 22 in such fashion that the faucet stems or rear connecting extensions 13a, intrude into said box through separate openings provided for that purpose, which openings generally are in line with each other. The stem of a standard beer faucet is usually of such length as to extend about 3½″ into the beer dispensing box and each such stem is conventionally threaded so as to receive a connecting and expansion member 30, sometimes hereinafter called special casting or doughnut 30 (Figs. 4 and 5).

Such special casting 30 may be of any metal or plastic or other material of like characteristics but preferably is formed or cast of a metal of good thermal conductivity, such as brass or copper; it may be regular or irregular in shape, square, polysided, oval or round; it is usually cast in the general form of a doughnut, and is actually a hollow nut or a circular endless pipe of about ¾″ inside diameter, the inner rim 30d of which is provided with a standard thread so as readily to screw upon any faucet stem 13a. Two machined nippled openings 30a, each about ½″, are provided in each such casting and on opposite sides thereof. Metal strips or projections 30c to baffle the flow of the expanded refrigerant liquid may be provided within the interior of such special casting 30. One such special casting is screwed upon the stem 13a of each faucet, as shown in Fig. 5, and thus the stem or rear projection of the faucet 13a becomes the core of the special casting 30.

The far end of the piece of refrigerant line 19.1, about 24″ long, last described as connected to the emergent orifice of channel 29a in the special casting 29, is firmly connected to one of the two openings 30a in the nearest special casting 30 by flare-nut, by soldering or other convenient means. A separate piece of refrigerant line 19.2, also about 24″ long, is then firmly connected to the remaining opening 30a in the special casting 30, and the other end of such line is firmly connected to the entrance orifice of the first U-shaped channel 29b which is nearest to the one end of special casting 29. A third piece of separate refrigerant line 19.3, also about 24″ long, is next firmly connected to the emergent orifice of such U-shaped channel 29b, and the far end of such line is firmly connected to the near opening 30a in the next special casting 30, that is, the special casting 30 which is screwed on to the stem of the faucet next adjoining the first faucet; a fourth piece of continued refrigerant line 19.4 is connected between the remaining opening 30a in such special casting 30 and the next adjoining orifice 29c in special casting 29, and so on, until all openings 30a in special castings 30 have been connected by refrigerant lines with all orifices in special casting 29, back and forth across the beer dispensing box, top and bottom, until finally in effect one continuous refrigerant line extends from the aforesaid thermostatic expansion valve to special casting 29, thence to, around and across the stem of each faucet 13, and finally to the far end of special casting 29.

At that point still another piece of refrigerant line or loop line 25 is connected to the emergent end orifice 29e of the last-named special casting, again by flaring, soldering or like convenient means. This piece of refrigerant line is measured to a length approximately twice as great as is the distance between the said beer dispensing box 22 and the said storage refrigerator box 10, allowing for necessary deviations from a straight line, and said refrigerant line is laid out and conveyed from an aperture in said beer dispensing box to the said storage refrigerator box, there through a round hole of appropriate size which is cut through the top or wall of said storage refrigerator, thence into said storage refrigerator for a distance of about six inches, thence doubled back upon itself in a U-loop for accommodating change in length with temperature changes and re-laid and re-conveyed along the path first followed in bringing the same from the said beer dispensing box to the said storage refrigerator, and so back to and into the said beer dispensing box. At such point a temperature bulb control 27 of conventional and accepted design, the function of which is to control the operation of the nearby thermostatic expansion valve 28 in such manner that the same admits into that part of the refrigerant line, beginning at said expansion valve and ending at such bulb, so much expansible refrigerant liquid, and only so much, that the evaporation and expansion of such between said expansion valve and said control bulb will remove a predetermined quantity of heat and thus achieve refrigeration to the degree required, is clamped or fastened to said refrigerant line and connected by capillary tube 27a to the thermostatic expansion valve in the conventional manner. Said temperature control bulb may, of course, be adjusted to suit the necessity or convenience of a particular operation, and the same may be set without regard to the setting of the temperature bulb control 21a which regulates the temperature in the said storage refrigerator. Insulation of such refrigerant loop line 25, between the beer dispensing box and the storage refrigerator, is provided as hereinafter described.

From the point in the beer dispensing box where the said refrigerant loop line is connected with the temperature bulb control, said line is passed through the opening in the end of said box through which such line 19 was first introduced into said box, and then is returned to the motor-compressor as a suction line 20, that is, a line whereby to convey the warm, expanded gases back to the motor-compressor, there to be compressed and re-liquefied in the accepted manner of the refrigeration art. The return line 20 is not insulated and not placed in contact with any other line or lines.

Within the refrigerator storage box, rods for the beer kegs or other containers are provided in the usual manner, and conduits 12 of block tin tubing, or other acceptable tubing, whereby to conduct the beer or other liquid to the distant point of dispensing are connected thereto, and such conduits are led to the aperture provided in the refrigerator box top or wall as aforesaid, through which has been brought the refrigerant expansion loop 25 heretofore described. Such conduits are then laid out and run, side by side from the said aperture in the refrigerator box to the beer dispensing box, and then all of such conduits, together with the line 25 forming said refrigerant expansion loop, are brought into close metal-to-metal contact with each other in such a way that the refrigerated line 25 forming said loop lies within the center of such beer conduits and throughout its length closely touches all or most of them, the whole thus forming a bundle or trunk 24 of refrigerant and beer conduit lines extending in close contact each line with the other from the said aperture in the refrigerator box to the aperture in the beer dispensing box before described; and said beer conduits are then led into said beer dispensing box to a point at or near said special casting 29.

Said bundle of lines may be, over its entire length, tightly wrapped with a thin metal tape 26 (about .0035 in thickness and of suitable width), in order to insure high thermal conductivity between the several conduits and the refrigerant loop line; and there is affixed overall, along the entire length of the bundle of conduits and refrigerant loop line, from the refrigerator box to the beer dispensing box, suitable insulating material 23, such as asbestos or moulded cork whereby thoroughly to insulate said lines against infiltration of extraneous heat. Said bundle of refrigerant and beer conduit lines may follow a straight or a tortuous course between the refrigerator box and the beer dispensing box, according to the necessities of the case and the convenience of the operator.

At or within said beer dispensing box 22 said conduits 12 and refrigerant loop line 25 are separated, each from the other, and one each of said conduits is then led to the stem of the faucet 13 it is to serve and is firmly connected thereto. Between the point where such conduits are separated, within the said beer dispensing box, and the several stems of the respective faucets, also within the beer dispensing box, each of said conduits is made to follow and to be in close metal-to-metal contact with two of the 24″ pieces of refrigerant line 19.1 to 19.8, heretofore described as extending in the beer dispensing box, back and forth, top and bottom, of said box from the special casting 29 to the several special castings 30 and between such special castings each respective conduit and the pair of refrigerant lines with which it is made to be in firm contact may be wrapped and insulated if necessary like the trunk line, depending upon the conditions prevailing.

The beverage is caused to flow in the conduits 12 by air pressure pipes 15 entering the kegs and supplied by an air pressure line 16.

In operation, refrigerant liquid is pumped through lines 19 and 19A, to the thermostatic expansion valves 28 and 28A. Each of such expansion valves respectively is controlled by temperature bulb controls 27 and 27A in the conventional manner so as to permit the passage of enough refrigerant liquid into and through the respective refrigerant lines, the evaporation of which will remove the required amount of heat and so produce the degree of refrigeration desired in the storage room 10 and in the conduit lines 12 and faucets 13 respectively; and each such temperature bulb control may be adjusted independently of the other. Such bulb controls ordinarily are adjusted so that no refrigerant liquid will pass them; that is, at those points all such liquid has been completely vaporized and only the resultant gases pass such controls and are returned back to the motor compressor 18 through suction lines 20 and 20A.

Accurate control is maintained by said thermostatic expansion valves and temperature bulbs. Instead of having one expansion control valve 28 for all faucets and the trunk cooling loop as shown in Fig. 1, it may be desirable to have a separate expansion valve for each faucet and for the trunk cooling loop as shown in Fig. 6, the corresponding parts here being designated by the same reference numerals with a prime (′) added.

It will thus be seen that the present invention provides a convenient, inexpensive and efficient system and method of cooling beverages or the like which are stored at one place and dispensed at another place. The storage box or room is subject to control and the conduits and dispensing means are subject to separate and independent control, though they both may be served by the same compressor or other cold producing means.

This invention provides for the dispensing of liquid in an improved manner and in a desired condition for the particular purpose or use of the liquid.

More particularly the invention provides for the dispensing of beer or other drinks at the most palatable temperatures for each of them, and to accomplish this result in the most effective and economical manner.

The invention herein describes, as an example, the improved system and apparatus for dispensing of beer, although it is to be understood that both the system or method and the apparatus may be readily employed in dispensing water, carbonated water, soft drinks or the like, at predetermined temperatures especially adapted for consumption of those drinks. Also, the improved system and apparatus is capable of employment in the chemical field where liquid chemicals or mixtures thereof are to be supplied at certain chilled temperatures.

While certain embodiments of the invention have been specifically illustrated and described, it is to be understood that the invention may be variously embodied within the limits of the prior art and the scope of the subjoined claims.

I claim:

1. A beverage serving system of the type described, comprising in combination, an insulated refrigerator storage box wherein are stored beverage containers, means for refrigerating said storage box and for regulating the temperature thereof independently of the temperature obtaining elsewhere in the system, a plurality of beverage conduits arranged in a group to conduct beverage from the beverage containers in said storage box to a dispensing point, means for refrigerating said conduits and for regulating the temperature thereof independently of the temperature obtaining in said storage box, said conduit refrigerating means including a refrigerant expansion conduit extending from adjacent the dispensing point to said storage box and return and having a loop in said storage box, a plurality of faucets, one on each beverage conduit at the dispensing point, and means for refrigerating said faucets and regulating the temperature thereof according to the temperature maintained in the beverage conduits but independently of the temperature obtaining in said storage box.

2. A beverage serving system of the type described, comprising in combination, an insulated refrigerator storage box wherein are stored containers with beverage which is dispensed therefrom in a refrigerated condition, means for refrigerating said storage box and for regulating the temperature thereof independently of the temperature obtaining elsewhere in the system, a beverage conduit disposed in an insulated duct whereby to conduct the beverage from a container in the storage box to a dispensing point, and means for refrigerating said beverage conduit and for regulating the temperature thereof independently of the temperature obtaining in said storage box, said conduit refrigerating means including a refrigerant conduit extending from adjacent the dispensing point to said storage box and return and having a loop in said storage box, a faucet on the dispensing end of the beverage conduit, and means for refrigerating said faucet and regulating the temperature thereof according to the temperature maintained in the beverage conduit but independently of the temperature obtaining in said storage box.

3. A beverage serving system of the type described, comprising in combination, a dispensing box, a dispensing faucet emerging from said box, a refrigerating storage box with beverage containers therein, a beverage conduit from a container in said storage box to said faucet and passing through said dispensing box, refrigerating means including controls for maintaining a predetermined temperature in said storage box, and refrigerating means, including a feed and return conduit line with direct expansion refrigerant laid alongside said beverage conduit and further controls therefor for maintaining a predetermined uniform temperature in said beverage conduit from the storage box to said dispensing box, in said dispensing box, and at said faucet, independently of the temperature obtaining in said storage box.

4. A beverage serving system, comprising in combination, a dispensing box, a plurality of dispensing faucets having their threaded stems extending into said dispensing box, a doughnut expansion member threaded on each faucet stem, a storage room, kegs of beverage in said storage room, feed conduits between said kegs and said faucets, independently and automatically controlled means for cooling said storage room by direct expansion, a connection casting in said dispensing box, conduits in series between said casting and said doughnut members, a loop expansion conduit from said connection casting along said feed lines to said room and return to said box, and means for independently cooling said box and said loop conduit as a unit by direct expansion.

5. A beverage serving system of the type described, comprising in combination, a dispensing box, a beverage faucet having its stem in said dispensing box, an expansion casing on said stem inside the dispensing box, a storage box with beverage containers therein, a beverage conduit from a container in said storage box to said faucet and passing through said dispensing box, direct expansion refrigerating means, including automatic controls in said storage box, for maintaining a predetermined temperature in said storage box, and direct expansion refrigerating means including automatic controls in said dispensing box, for maintaining a predetermined uniform temperature in said beverage conduit from the storage box to said dispensing box, in said dispensing box, and in said stem casing, independently of the temperature obtaining in said storage box, said last mentioned refrigerating means comprising a series pipe line extending from the stem casing back to the wall of said storage box and in metal-to-metal contact with said beverage conduit throughout this distance but keeping the expansion fluid out of direct contact with the beverage conduit walls at all places.

6. A beverage serving system of the type described, comprising in combination, a refrigerating storage box for beverage containers, a dispensing faucet having a stem, a beverage conduit from said stem to a container in said storage box, a refrigerant casing having a fully enclosed annular chamber and a continuous imperforate inner wall in firm metal-to-metal contact throughout its length with said stem, an insulating enclosure about said beverage conduit, the faucet stem, and the refrigerant casing, from said storage box to said faucet, refrigerating means, including controls, for maintaining a predetermined temperature in said storage box, and direct expansion refrigerating means, including a refrigerant fluid feed and return line connected to said stem casing and extending in contact with the beverage conduit from said casing for a distance toward the storage box, said last mentioned refrigerating means also including controls for maintaining a predetermined uniform temperature in said beverage conduit and at the faucet independently of the temperature obtaining in said storage box.

7. A beverage serving system, comprising in combination, a dispensing box, a plurality of dispensing faucets having their stems extending into said dispensing box, a doughnut expansion member for each faucet having a continuous imperforate inner wall surrounding the faucet stem, a connection member in said dispensing box, beverage conduits from said faucet stems extending past said connection member, a pressure feed line and suction return line for expansible refrigerating fluid connected to said connection member, and feed and return lines between said connection member and said doughnut members, said feed and return lines lying in pairs alongside each beverage conduit.

8. A beverage serving system, comprising in combination, a dispensing box, a plurality of dispensing faucets having their stems extending into said dispensing box, a doughnut expansion member for each faucet having a continuous imperforate inner wall surrounding the faucet, stem, a connection member in said dispensing box, beverage conduits from said faucet stems extending past said connection member, a pressure feed line and suction return line for expansible refrigerating fluid connected to said connection member, expansion feed and return lines from said connection member to said doughnut member and back, said feed and return lines lying in pairs alongside each beverage conduit, and thermostat controls in said dispensing box for controlling the supply of fluid to said pressure feed line, the connection member, and the expansion feed and return lines for the beverage conduits in accordance with the condition of the suction return line.

9. A beverage serving system, comprising in combination, a plurality of dispensing faucets having their stems extending into a dispensing box, a doughnut expansion member for each faucet having its imperforate inner wall in thermal connection with a faucet stem, a storage room, beverage containers stored in said room, beverage feed conduits between said containers and said faucets, independently and automatically controlled means for cooling said storage room by direct expansion and controlling the flow of refrigerating fluid by a thermostat in the suction return line therefrom, a connection member in said dispensing box, an expansion loop line extending from said connection member to said room and back alongside said beverage feed conduits, expansion conduits in series between said connection member and said doughnut expansion members, and independently and automatically controlled means for regulating the flow of fluid in the pressure feed line to said connection member by a thermostat in the suction return line leaving the dispensing box.

10. In a beverage serving system, in combination, a faucet having a threaded stem, a metal casing having a fully enclosed annular chamber and a continuous imperforate inner wall threaded throughout its length on said stem, and conduit connections on said casing adjacent to said periphery aligned approximately with said stem, said connections opening rearwardly away from the faucet end of the stem.

11. In a beverage serving system, in combination, a supporting wall, a faucet mounted on the outer side of said wall, a stem on said faucet extending through said wall, a beverage supply pipe connected to said stem, a metal casing having a fully enclosed annular chamber and a continuous imperforate inner wall threaded on the stem of said faucet, conduit nipples on said casing disposed approximately parallel to said stem, and inlet and outlet conduits for refrigerating fluid connected to said nipples.

12. In a beverage serving system, in combination, a faucet having an elongated stem, a metal casing having a fully enclosed annular chamber and a continuous imperforate inner wall in tight metal-to-metal contact throughout its entire length with said stem, said casing being relatively short axially and wide transversely, connections for refrigerating fluid at the periphery of the casing at opposite ends of a diameter, and radial baffle plates inside said casing extending between the end walls thereof for forcing fluid to pass over the inner wall around the stem in travelling from one connection opening to the other.

13. A system as set forth in claim 12, further characterized by the fact that said connection openings are disposed approximately parallel to the axis of the stem, and that both open to the rear away from the faucet.

ALFRED H. BRUNDAGE.